United States Patent [19]

Hatayama et al.

[11] Patent Number: 4,850,237

[45] Date of Patent: Jul. 25, 1989

[54] TOOTH PROFILE IN MESHING MECHANISM

[75] Inventors: Takayoshi Hatayama, Hiratsuka; Kunio Kawamoto, Odawara, both of Japan

[73] Assignee: Sumitomo Heavy Industries, Ltd., Tokyo, Japan

[21] Appl. No.: 103,578

[22] PCT Filed: Dec. 16, 1986

[86] PCT No.: PCT/JP86/00636

§ 371 Date: Aug. 17, 1987

§ 102(e) Date: Aug. 17, 1987

[87] PCT Pub. No.: WO87/03945

PCT Pub. Date: Jul. 2, 1987

[30] Foreign Application Priority Data

Dec. 17, 1985 [JP] Japan .................. 60-281930

[51] Int. Cl.$^4$ ............................................. F16H 55/08
[52] U.S. Cl. .................................. 74/462; 74/640
[58] Field of Search ................... 74/460, 462, 640

[56] References Cited

U.S. PATENT DOCUMENTS

| | | | |
|---|---|---|---|
| 2,209,201 | 7/1940 | Hill | 74/462 |
| 2,960,884 | 11/1960 | Hill | 74/462 |
| 3,709,055 | 1/1973 | Grove | 74/462 |
| 3,856,440 | 12/1974 | Wildhaber | 74/462 X |
| 4,348,918 | 9/1982 | Fakni | 74/805 |
| 4,673,342 | 6/1987 | Saegusa | 74/462 X |

FOREIGN PATENT DOCUMENTS 45-41172 12/1970 Japan .
46-32883 9/1971 Japan .
50-36137 10/1975 Japan .
50-46115 12/1975 Japan .

Primary Examiner—Dwight G. Diehl
Attorney, Agent, or Firm—Armstrong, Nikaido, Marmelstein, Kubovcik & Murray

[57] ABSTRACT

A tooth profile in a meshing mechanism is arranged in such a way that the tooth profile of a deflectable tooth row is formed by a circular-arc-shaped addendum and lines tangential to the circular arc, while the tooth profile of two second tooth rows meshing with the tooth row with that tooth profile, one of the second tooth rows being fixed and the other being moveable, are based on an envelope of the locus of movement of the circular-arc-shaped addendum, or a line approximated thereto by circular arcs and straight lines. In the meshing mechanism having this tooth profile, the deflectable tooth row and the two tooth rows mesh with each other over a wide region and a low level of angular backlash can be obtained thereby. For this reason, the contact pressure on the working surfaces of the teeth can be alleviated, and the lifetime of the teeth can be prolonged.

3 Claims, 5 Drawing Sheets

TOOTH PROFILE IN MESHING MECHANISM

TECHNICAL FIELD

The present invention relates to the tooth profiles of externally- and internally-toothed gears in a planetary gear mechanism or the tooth profiles of a rack and a pinion rack in a rack meshing mechanism, and, more particularly, to tooth profiles for use in meshing mechanisms in which the load on each tooth is reduced and play and clearances are minimized.

BACKGROUND ART

Planetary gear mechanisms are employed in various kinds of reduction mechanism since they have a large reduction gear ratio and can bear a large transmission load. Of these planetary gear mechanisms, a known mechanism called a harmonic reduction gear is provided with two internally-toothed gears having mutually different numbers of teeth, a phase difference due to the difference in the number of teeth of the two internally-toothed gears is created for each rotation of an input shaft, by deflecting an annular externally-toothed gear which meshes with the internally toothed gears, and rotational speed is reduced by transmitting this phase difference to an output shaft. Such gear mechanisms are shown in Examined Publication Nos. 36137/75 and 46115/75, and Japanese Patent Examined Publication Nos. 32883/71 and 41172/70.

A more detailed description of this harmonic reduction gear will be given below.

Referring to FIGS. 1 and 2, an oval eccentric member 2 is fixed to an input shaft 1, and an annular externally-toothed gear 3 is slidably supported by the outer periphery of the eccentric member 2. The annular externally-toothed gear 3 is deflectable and meshes with internally-toothed gears (discribed below) at two portions on the long-diameter sides of the oval eccentric member 2, but does not mesh with the internally-toothed gear on the short-diameter sides thereof. Two internally-toothed gears 4, 5 are provided around the external periphery of the exterally-toothed gear 3, the internally-toothed gear 4 being secured to a casing 6 and the internally-toothed gear 5 being connected to an output shaft 7. In this embodiment, the number of teeth of the internally-toothed gear 4 is identical to that of the externally-toothed gear 3, and there is a small difference in the number of teeth between the internally-toothed gears 4 and 5.

In operation, when the eccentric member 2 eccentrically rotates once, the externally-toothed gear 3 meshes with the internally-toothed gears 4 and 5. Since the internally-toothed gear 4 is fixed, the internally-toothed gear 5 is displaced by a relative amount given by the difference in the number of teeth, the output shaft 7 rotates through an angle given by the difference in the number of teeth, and thus rotation of the input shaft 1 is transmitted to the output shaft 7 to cause the same to rotate at a reduced speed.

However, the meshing mechanism of the above-described conventional harmomic reduction gear has the drawbacks described below.

In the first place, the gear transmission mechanism provides faulty transmission based on play and backlash, so that rotation of the input shaft 1 is sometimes not transmitted directly as rotation of the output shaft 7. Such relative faulty transmission between the input shaft 1 and the output shaft 7 is hereafter called angular backlash.

Position-controlling reduction gears used in precision machinery such as industrial robots and machine tools are required to have a high reduction gear ratio and high efficiency, high rigidity, and low angular backlash characteristics.

Referring to FIG. 3, a tooth profile 8 of the externally-toothed gear 3 is a triangular or involute tooth profile, and the envelope of the locus of the tooth profile when the externally-toothed gear 3, which has the tooth profile 8, meshes with the internally-toothed gear 5, which has a different number of teeth, is determined by the locus of an angular portion 9 of the tooth profile 8. In other words, a tooth profile 10 of the internally-toothed gear 5 which provides low angular backlash is determined on the basis of the envelope drawn by the angular portion 9 of the tooth profile 8 of the externally-toothed gear 3. Accordingly, torque is transmitted to the tooth profile 10 via the angular portion 9 which forms an acute angle of the tooth profile 8, and the arrangement is such that the contact pressure acting on the working face is large, thereby reducing the life of the teeth.

In addition, as shown in FIG. 4, in the locus of the tooth profile 8 formed as the externally-toothed gear 3 meshes with the internally-toothed gear 4, which has the same number of teeth, a part of the tooth profile 8 does not form the envelope, and the tooth profile 8 is located in the outermost portion of the envelope only at a special meshing position (the tooth profile 8 is located on the innermost side of a tooth profile 11 of the internally-toothed gear 4). For this reason, the configuration of the tooth profile 11 of the internally-toothed gear 4 is determined by the position at which the tooth profile 8 of the externally-toothed gear 3 is located at the outermost portion of the envelope. Consequenty, a low angular backlash can be secured only at the position at which this tooth profile 8 is located at the outermost portion, and the gap between the tooth profile 8 and the tooth profile 11 gradually widens with distance from this position as a boundary, so that the externally-toothed gear 3 and the internally-toothed gear 4 become disengaged from each other, leading to a decline in the contact ratio of the entire gear. Consequently, the load borne by each tooth increases, with the result that the strength of the tooth drops and apparent angular backlash increases because of deformation of the teeth.

The above-described drawback also appears in the meshing of the precision fine-adjustment mechanism having the same tooth profile as the planetary gear mechanism, described previously and shown in FIG. 5. In such precision fine-adjustment mechanism, fine displacement by means of engagement between two linear racks and a pinion rack which is deflectable is provided. A reciprocating cam 32 is provided on a guideway 31 via roller bearings 33. A deflectable pinion rack 35 is provided on the cam 32 via roller bearings 34. The pinion rack 35 meshes with two linear racks 36, 37. The linear rack 36 is movable, but the linear rack 37 is fixed. The number of teeth per unit length of the linear rack 37 is identical to that of the pinion rack 35. The tooth pitch per unit length of the linear rack 36 is different from that of the linear rack 37.

Consequently, if the cam 32 slides a unit length, the displacement of the movable rack given by the phase difference in the tooth pitch between the two linear racks 37 and 36 is obtained.

The tooth profile of each of the racks used in the above-described precision fine-adjustment mechanism has the same configuration as the tooth profile of the planetary gear mechanism described previously, and has a similar drawback.

An object of the present invention is to provide a tooth profile in a meshing mechanism which ameliorates the drawback of the above-described meshing mechanisms and has a high reduction gear ratio and high efficiency, high rigidity, and low angular backlash characteristics.

DISCLOSURE OF INVENTION

According to the present invention, there is provided a tooth profile in a meshing mechanism having a first tooth row deflectable by a working member and two second tooth rows meshing with the first tooth row, the two second tooth rows having mutually different pitches of number of teeth per unit length, either one of the two second tooth rows being fixed while the other is movable, and the displacement of the movable second tooth row being obtainable by a phase difference obtained by the difference in pitch of the number of teeth of the two second tooth rows relative to the sliding of the working member per unit length, characterized in that:

The tooth profile of the first tooth row is constituted by a semi-circular-arc-shaped addendum and tangential lines from said circular arc, and the tooth profile of the second tooth rows is formed as a curve based on the envelope of the locus of movement of the semi-circular-arc-shaped addendum or a line approximated by a semi-circular-arc and straight lines.

The tooth profile in the meshing mechanism according to the present invention is such that the addenda of the first tooth row are semi-cicular-arc-shaped, so that the contact pressure acting on the working surface is reduced, resulting in an increased lifetime of the teeth. In addition, since the tooth profile of the first tooth row is semi-circular-arc-shaped, the tooth profile of the second tooth row, which has the same number of teeth can be made as an envelope of that tooth profile, or an approximation thereof. As a result, the contact ratio is improved and a low angular backlash can be attained, and, at the same time, it is possible to obtain a meshing mechanism for a transmitting apparatus which is very rigid and efficient. Futhermore, when the areas of contact between the tooth profile of the first tooth row and the tooth profiles of the two second tooth rows are in phase, it is possible to obtain a low angular backlash and higher rigidity.

BEST MODE FOR CARRYING OUT THE INVENTION

Referring now to the accompanying drawings, embodiments of the present invention will be described.

Figure 1:
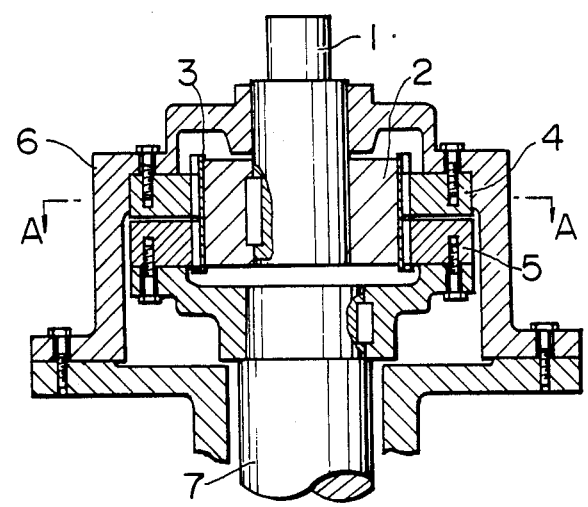
FIG. 1 is a cross-sectional view illustrating an example of a conventionally known harmonic reduction gear.
Figure 2:
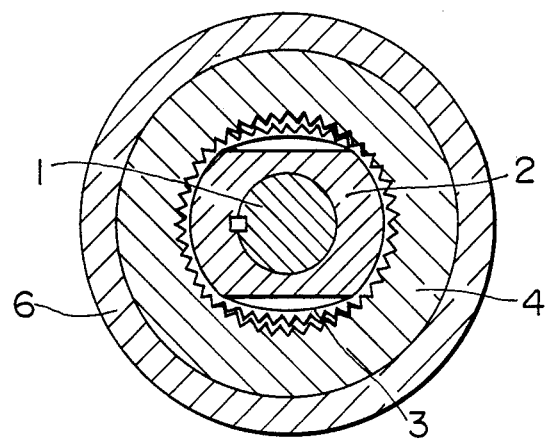
FIG. 2 is a cross-sectional view taken at A—A, FIG. 1.
Figure 3:
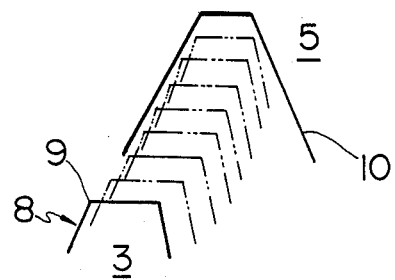
FIG. 3 is a partial front elevational view illustrating the locus of movement of the tooth profile of the conventional externally-toothed gear and the engagement thereof with other internally toothed gear.
Figure 4:
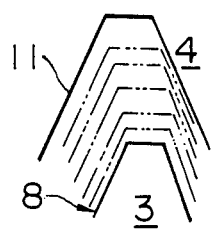
FIG. 4 is a partial front elevational view illustrating the locus of movement of the tooth profile of the conventional externally-toothed gear and the engagement thereof with the other internally-toothed gear.
Figure 5:
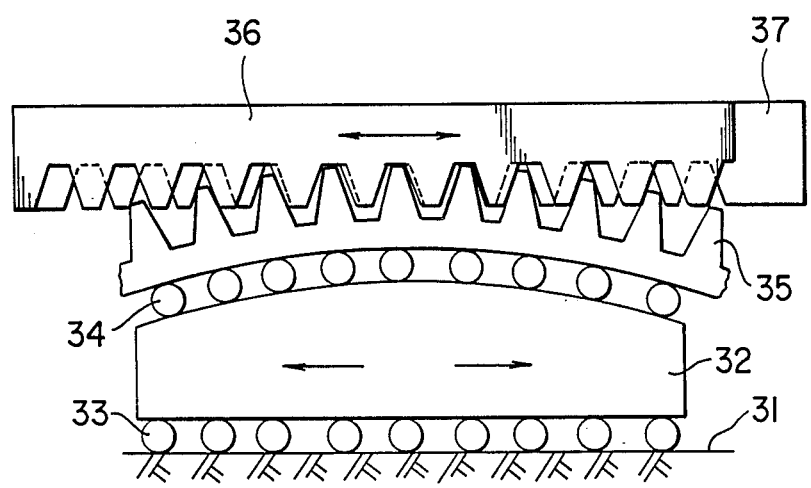
FIG. 5 is a cross-sectional view illustrating an example of a conventionally know gear of FIGS. 3 and 4 in a precision fine-adjustment mechanism.

In the following description, the arrangement of an input shaft, an output shaft, an externally-toothed gear, an internally-toothed gear having the same number of teeth as that of the externally-toothed gear, an internally-toothed gear having a number of teeth which differs from that of the externally-toothed gear, and the casing is identical to that of the known planetary gear mechanism shown in FIGS. 1 and 2. Therefore, reference will be made to the description of the background art with respect to the arrangement thereof, and description will be made hereafter using the same reference numerals.

Figure 6:
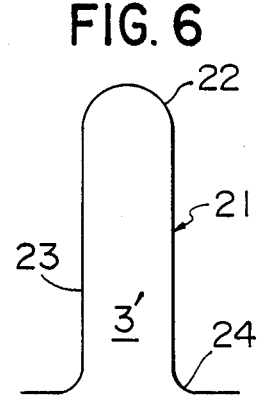
FIG. 6 is a partial front elevational view of the tooth profile of an externally-tooth gear or a pinion rack in accordance with one embodiment of the invention.

Referring to FIG. 6, a tooth profile 21 of the externally-toothed gear 31 ' of the instant invention comprises an addendum 22 constituted by a semi-circular-arc and tangential lines 23, each extending from an end of the circular arc. Radii 23' are provided at the root of the tooth profile 21 so as to avoid stress concentrations.

When the externally-toothed gear 3', which is constructed as decribed above and has the tooth profile 21, meshes with the internally-toothed gear 5' which has a different number of teeth, since the addendum 22 is semi-circular-arc-shaped, the contact pressure on the working surface is alleviated, with the result that the lifetime of the teeth can be prolonged.

Figure 8:
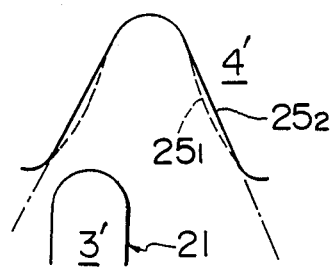
FIG. 8 is a partial front elevational view illustrating the tooth profile of an internally-toothed gear or rack in accordance with the embodiment of the present invention, as well as an approximate tooth profile thereof.
Figure 7:
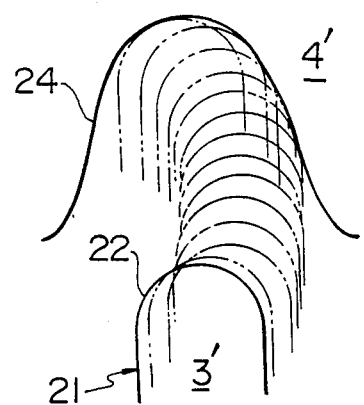
FIG. 7 is a view illustrating the locus of the movement of the tooth profile shown in FIG. 6 and the envelope of circular-arc-shaped addenda to the teeth.

In addition, when the externally-toothed gear 3', which is constructed as described above and has the tooth profile 21, meshes with the internally-toothed gear 4', which has the same number of teeth, a locus of movement such as that shown in FIG. 7 is drawn. Since the addendum 22 is circular-arc shaped, the locus of part of the addendum 22 becomes the envelope shown by reference numeral 24 in the drawing. Therefore, as shown in FIG. 8 a tooth profile $25_1$ of the internally-toothed gear 4' is formed on the basis of the invelope 24, or a tooth profile $25_2$ of the internally-toothed gear 4' is obtained by approximating the envelope 24 by means of a circular arc and straight lines. By virtue of this arrangement, the externally-toothed gear 3' with the tooth profile 21 meshes with the internally-toothed gear 4' with the tooth profile $25_1$ or $25_2$ over a wide range, so that a low angular backlash can be obtained.

Furthermore, since the externally-toothed gear 3' with the tooth profile 21 simultaneously meshes with the two internal gears 4', 5', if the area of contact of the externally-toothed gear 3' with the tooth profile 21 and the internally-toothed gear 4' with the tooth profile $25_1$ or $25_2$ and the area of contact of the externally-toothed gear 3' with the profile 21 and the internally-toothed gear 5' are adjusted so as to be in the same phase, the tooth profile 21 of the externally-toothed gear 3' is simultaneously clamped by both the tooth profile $25_1$ or $25_2$ of the internally-toothed gear 4' and the tooth profile of the internally-toothed gear 5' from both sides, with the result that the region of low angular backlash increases overall. For this reason, the contact ratio is increased and torsional rigidity is improved, enabling highly efficient transmission.

Figure 9:
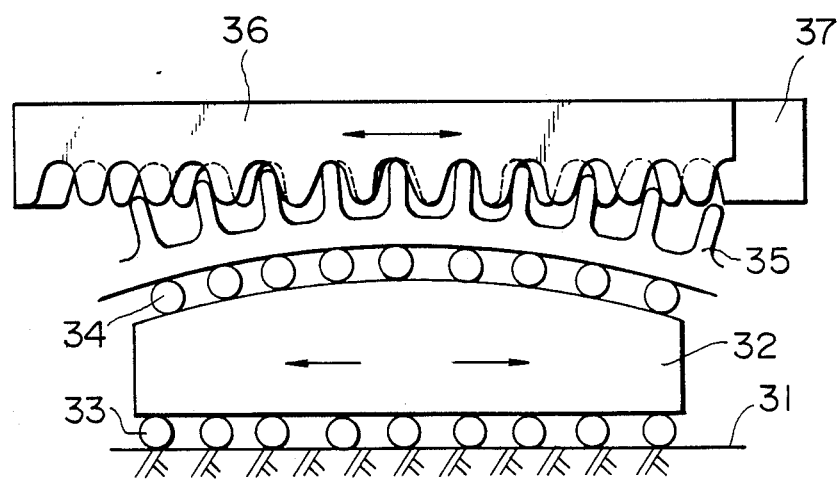
FIG. 9 is a cross sectional view illustrating an embodiment of the tooth profile of the instant invention applied to a precision fine-adjustment mechanism

It should be noted that, as is apparent from its aims, the present invention is applicable not only to this above-described planetary gear mechanism but also to the precision fine-adjustment mechanism shown in FIG. 9, and that these and other similar mechanisms are also included in the embodiments of the present invention.

INDUSTRIAL APPLICABILITY

As decribed above, the tooth profile in a meshing mechanism in accordance with the present invention is also applicable to other devices which make use of a meshing mechanism which is designed to impart displacement to a tooth row by making a deflectable tooth row simultaneously engage with two tooth rows which have mutually different pitches, one of these two tooth rows being fixed while the other is movable.

What is claimed is:

1. A tooth profile in a meshing mechanism having a first tooth row movable along a path by a working member and two second tooth rows meshing with said first tooth row, said two second tooth rows having mutually different pitches of numbers of teeth per unit length along said path one of said two second rows being fixed on said path while the other of said second tooth rows is movable along said path, the movement of said movable tooth row relative to said fixed tooth row resulting from the difference in pitch of the number of teeth of said two second tooth rows relative to the sliding of said working member per unit length along said path, characterized in that:

the tooth profile of said first tooth row is constituted by a semi--circular, arc-shaped addendum having side walls constituted by substantially parallel tangential lines from said semi-circular arc and extending inwardly from the ends of said semi-circular addendum to form an envelope, when said first tooth row is moved along said path, shaped by the locus of movement of said semi-circular addendum, and the tooth profile of said second tooth rows is formed as a curve based on said envelope of the locus of movement of said semi-circular, arc-shaped addendum of said first tooth row or a line approximated by a semi-circular arc and straight lines to resemble said envelope.

2. A tooth profile in a meshing mechanism according to claim 1, wherein said tooth profile is used in a planetary gear mechanism, said working member is an eccentric member fixed to an input shaft, said first tooth row is an annular externally-toothed gear, said two second tooth rows are two internally-toothed gears having mutually different numbers of teeth, one of said two internally-toothed gears is fixed while the other is connected to an output shaft, whereby said output shaft rotates by the phase difference obtained by the difference in the number of teeth of said internally-toothed gears in response to one eccentric rotation of said eccentric member.

3. A tooth profile in a meshing mechanism according to claim 1, wherein said meshing mechanism is used in a precision fine-adjustment mechanism, said working member is a reciprocating cam, said first tooth row is a pinion rack, and said second tooth rows are linear racks.

* * * * *